United States Patent [19]
Liska

[11] Patent Number: 5,629,484
[45] Date of Patent: May 13, 1997

[54] METHOD AND APPARATUS FOR MONITORING A LASER ABLATION OPERATION INVOLVING MULTIPLE ABLATION SITES ON A WORKPIECE

[75] Inventor: Miroslav Liska, Boise, Id.

[73] Assignee: Micron Technology, Inc., Boise, Id.

[21] Appl. No.: 444,594

[22] Filed: May 19, 1995

[51] Int. Cl.$^6$ .................................................. B23K 26/02
[52] U.S. Cl. .................. 73/587; 219/121.68; 219/121.83
[58] Field of Search ..................... 73/587; 219/121.61, 219/121.62, 121.66, 121.68, 121.69, 121.7, 121.78, 121.83

[56] References Cited

U.S. PATENT DOCUMENTS

| | | | |
|---|---|---|---|
| 4,504,727 | 3/1985 | Melcher et al. | 219/121.62 |
| 4,608,480 | 8/1986 | Bizot et al. | 219/121.7 |
| 5,026,964 | 6/1991 | Somers et al. | 219/121.7 |
| 5,045,669 | 9/1991 | Ortiz, Jr. et al. | 219/121.83 |
| 5,196,006 | 3/1993 | Klopotek et al. | 128/897 |
| 5,286,947 | 2/1994 | Clyde et al. | 219/121.83 |
| 5,329,090 | 7/1994 | Woelki et al. | 219/121.68 |

*Primary Examiner*—Hezron E. Williams
*Assistant Examiner*—Rose M. Miller
*Attorney, Agent, or Firm*—Angus C. Fox, III

[57] ABSTRACT

The invention, in its most basic form, is a sensor which detects sound generated by a laser ablation process. In a preferred embodiment of the invention, a conveyor system presents leadframe strips, having a fixed number of semiconductor packages which have not yet been singulated, to a laser marking apparatus. A dynamic microphone receives an analog input each time the laser marking apparatus makes a mark on a package. The analog input related to each mark is converted to a digital pulse. The series of pulses corresponding to the marking of packages on the leadframe strip are fed to a counter. The contents of the counter are compared with a preset number that corresponds to an expected number of pulses for the particular type of leadframe in use. The conveyor system is stopped so that the problem can be corrected if the expected number of pulses is not received by the counter, which indicates that one or more parts has not been properly marked. The invention may be applied to any operation requiring the marking of multiple sites on a single workpiece.

12 Claims, 4 Drawing Sheets

5,629,484

METHOD AND APPARATUS FOR MONITORING A LASER ABLATION OPERATION INVOLVING MULTIPLE ABLATION SITES ON A WORKPIECE

FIELD OF THE INVENTION

This invention relates to a device and method for detecting occurrences and non-occurrences of laser ablation. Although disclosed in the context of a method and apparatus for detecting the marking of plastic-encapsulated semiconductor memory packages with laser energy, the invention may be applied to many other applications.

BACKGROUND OF THE INVENTION

The ablative marking of products with laser energy has become widespread for a number of reasons. The laser marking process is very fast, features ultra high resolution, can be reprogrammed on the fly with only a software change, requires no consumables such as ink, does not smudge as does wet paint, and requires no drying time.

Because of the aforementioned advantages over other types of marking processes, laser marking is used extensively for the marking of semiconductor packages. Although initially utilized for placing coded identification relating to manufacturing (e.g., lot number) on the bottom of semiconductor packages, lasers are now being used with increasing frequency to engrave the manufacturer's logo and part number on the top of packages.

One of the problems associated with any marking process, whether laser or offset-ink based, is the problem of intermittent equipment malfunction, which may result in unmarked items. Manual inspection of items for the purpose of identifying those which have not been marked is both costly and somewhat ineffective, as only about 80% of the unmarked items are typically discovered. Rework of the unmarked items can also be costly and inefficient. What is needed for the laser marking process is a method and apparatus for detecting when a part is not marked during the marking operation itself.

SUMMARY OF THE INVENTION

This invention is a method and apparatus for detecting and counting multiple occurrences of sound generated by a laser ablation operation. In addition, the invention is a method and apparatus for determining whether or not a correct number of occurrences have been counted for a particular workpiece, and for taking remedial action if an incorrect number have been counted. In a preferred embodiment implementation of the invention, a conveyor system presents leadframe strips, having a fixed number of semiconductor packages which have not yet been singulated, to a laser marking apparatus. A dynamic microphone receives an analog input each time the laser marking apparatus marks a package. The analog input related to each mark is converted to a digital pulse. The series of pulses corresponding to the marking of packages on the leadframe strip are fed to a counter. The contents of the counter are compared (in the disclosed embodiment, the comparison is performed indirectly by routing the counter output through a gate array) with a preset number that corresponds to an expected number of pulses for the particular type of leadframe in use. The conveyor system is stopped so that the problem can be corrected if the leadframe is improperly loaded on the conveyor system, or if the expected number of pulses is not received by the counter, which indicates that one or more parts has not been properly marked. The invention may be applied to any operation requiring the marking of multiple locations on a single workpiece.

PREFERRED EMBODIMENT OF THE INVENTION

Figure 1A:
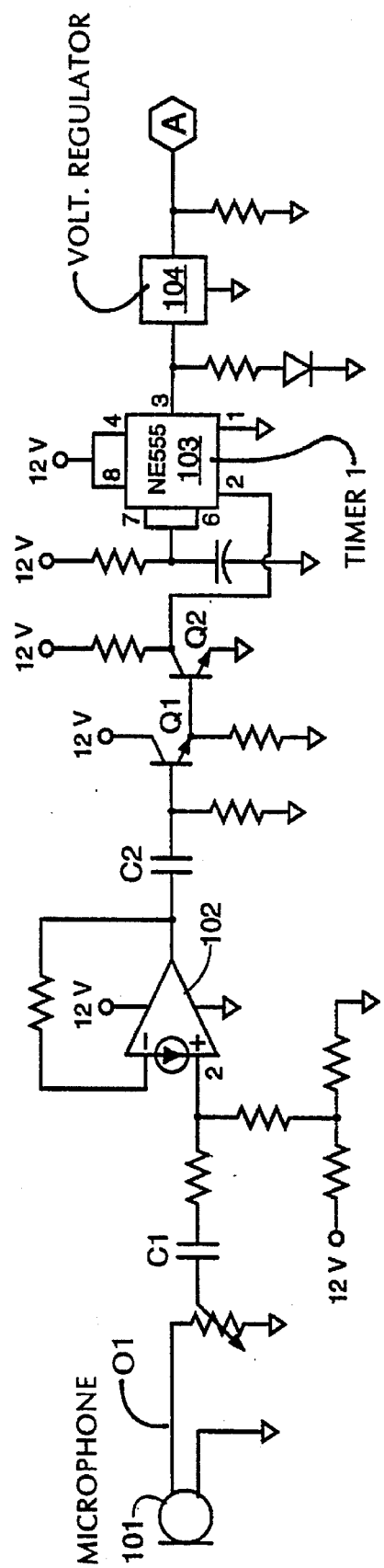
FIGS. 1A, 1B and 1C are interconnecting partial electrical schematic diagrams of a preferred embodiment of the laser mark detection sensor. Together, they form a complete schematic diagram.

Referring now to FIG. 1A, a series of analog AC signals are produced at the output O1 of a dynamic microphone 101 that is in close proximity to a workpiece (not shown) as it is marked in multiple locations by an incident computer-controlled laser beam. A coupling capacitor C1 is used to isolate the AC signal produced by the microphone from subsequent DC components. Operational amplifier 102 is used to amplify the signals which are passed through capacitor C1. Transistor Q1 is used to eliminate the negative portion of the waveform, and the output of transistor Q1 is applied to the base of NPN transistor Q2, the function of which is to ground pin 2 of a first NE555 timer 103. In response to the periodic grounding of pin 2, the timer 103 produces a digital pulse, each of which corresponds to the marking of a single location on the workpiece. A 5-volt voltage regulator 104 maintains the digital pulses emanating from timer 103 at a preferred logic voltage level.

Figure 1B:
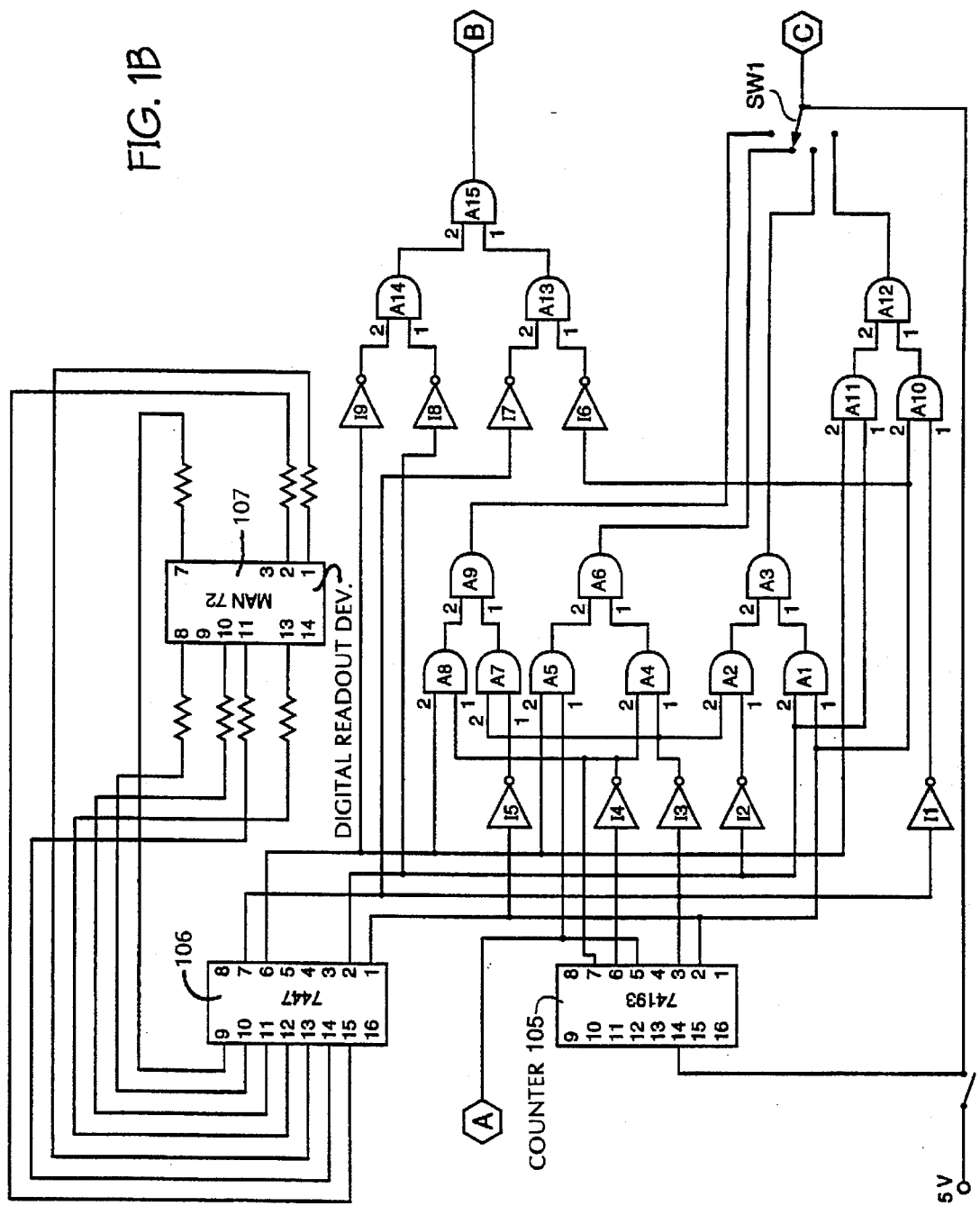

Referring now to FIG. 1B, the regulated pulses from timer 103 are introduced to pin 5 of a 74193 counter 105. An array of digital gates is associated with timer output pins 2, 3, 6 and 7 and with each position of thumbwheel switch SW1, which sets the number of locations on the workpiece which are to be laser marked. Inverters I2 and I3, as well as AND gates A1, A2 and A3 are associated with 6 locations; inverters I3 and I4, as well as AND gates A4, A5 and A6 are associated with 10 locations; inverters I3, I4 and I5, as well as AND gates A7, A8 and A9 are associated with 8 locations; and inverter I1 and AND gates A10, A11 and A12 are associated with 14 locations. When a particular array is selected by switch SW1, the output to the switch will be high when the count associated with that array is correct, and the high output will reset counter 105. Conversely, when a particular array is selected by switch SW1, the output to the switch will be low when the count is incorrect, and counter 105 will not be reset.

Still referring to FIG. 1B, an additional gate array consisting of inverters I6, I7, I8 and I9, as well as AND gates A13, A14 and A15 are also coupled to terminals 2, 3, 6, and 7 of timer 105. The output of AND gate A15 is coupled to the input of AND gate A16 through inverter I10. The output of inverter I10 is sampled only after the workpiece has passed the trigger sensor and trigger sensor signal TS1 goes high. The high TS1 signal indicates that the entire workpiece has passed the laser beam, and that all designated locations on the workpiece have had an opportunity to be marked. If the proper number of locations have been marked, the counter has been reset by the a high output at switch SW1, and the signals on terminals 2, 3, 6 and 7 will all be low. However, if the count was incorrect and the counter has not been reset because of a low output at switch SW1, at least one of the signals on terminals 2, 3, 6 and 7 will be high.

This condition will be reflected at the output of AND gate A15, as well as at terminal 1 of AND gate A16. If the input at terminal 1 of AND gate A16 is high when trigger sensor signal TS1 goes high, this indicates that the counter has not been reset because of an incorrect count, and the output of AND gate A16 will be high. This high output is passed through OR gate O1, through inverter I11 and to transistor Q3, which activates relay RL1. Contacts 1 and 2 of normally-closed relay RL1 are opened. This open circuit produced by relay RL1 is used to shut down the conveyor system which transports the workpiece. The inadequately marked workpiece can then be removed, inspected and remarked.

Still referring to FIG. 1B, it will be noted that terminals 1, 2 6 and 7 of a 7447 driver chip 106 are also connected to the array of digital gates. Output terminals 9–15 of the driver chip 106 are connected to a MAN 72 digital readout device 107, which displays the actual number of locations marked on the workpiece.

As there is a certain amount of lag time associated with the count analysis, the conveyor system may not have stopped before at least one location on a new workpiece has been presented to the marking station and marked by the laser beam. Thus, if the count was incorrect, it will be necessary to reset the counter by some other means before the laser beam has begun to mark the new workpiece. This is accomplished by a delayed reset signal generated by the closing of the contacts of relay RL2, which is activated by the delayed receipt of trigger sensor signal TS1. The receipt of signal TS1 is delayed by delay path circuitry DP1 which includes diode D1, transistor Q6, a pair of variable resistors VR1 and VR2 and a capacitor C3. Because the delayed reset signal is generated after the undelayed reset signal TS1 arrives at terminal 2 of AND gate A16, the decision to stop the conveyor system will be made before the delayed reset signal reaches the counter 105. Although the conveyor system may stop, the counter will have already been reset by the delayed reset signal and the counter will have recorded any marking actions that have been taken by the laser beam on the new workpiece. Although the conveyor system may stop before the new workpiece is completely marked, the counter will retain the partial count, so that when the conveyor system is restarted, the counter will continue to count additional marked locations as marking of the new word piece continues.

On occasion, no location on the workpiece receives a laser mark, either because the laser beam has become totally inoperative, or because, although the laser beam fires the proper number of times, no marks are placed at the proper locations. The latter situation can occur, in the case of packages on a lead frame which are to be sequentially marked, when the lead frame passes the laser station upside-down on the conveyor belt, or when the first sensing hole on the lead frame is blocked. In such a case, no count is performed by the counter 105 because no sound is generated by laser ablation as the workpiece is marked. Therefore, this condition results in a high input at terminal 1 of AND gate A17. A proximity sensor (please refer to the description of FIG. 2) generates a pulse PS1 after the conveyor system has transported the workpiece past a point at which laser marking should have begun. The PS1 signal pulse is transformed into a useable high logic pulse by a 555 timer 108, and the high logic pulse from timer 108 is received by AND gate A17 on terminal 2. If no count is displayed on the counter (indicated by a high input at terminal 1 of gate A17) when terminal 2 of gate A17 receives the logic pulse generated from the PS1 pulse, the combination of high signals at gate A17 results in a high input to terminal 2 of OR gate O1, a high input to inverter I11, and a high signal applied to the base of transistor Q3. As a consequence, relay RL1 is activated (as also in the case of an improper count) and the conveyor system is shut down so that the problem can be resolved.

Figure 1C:
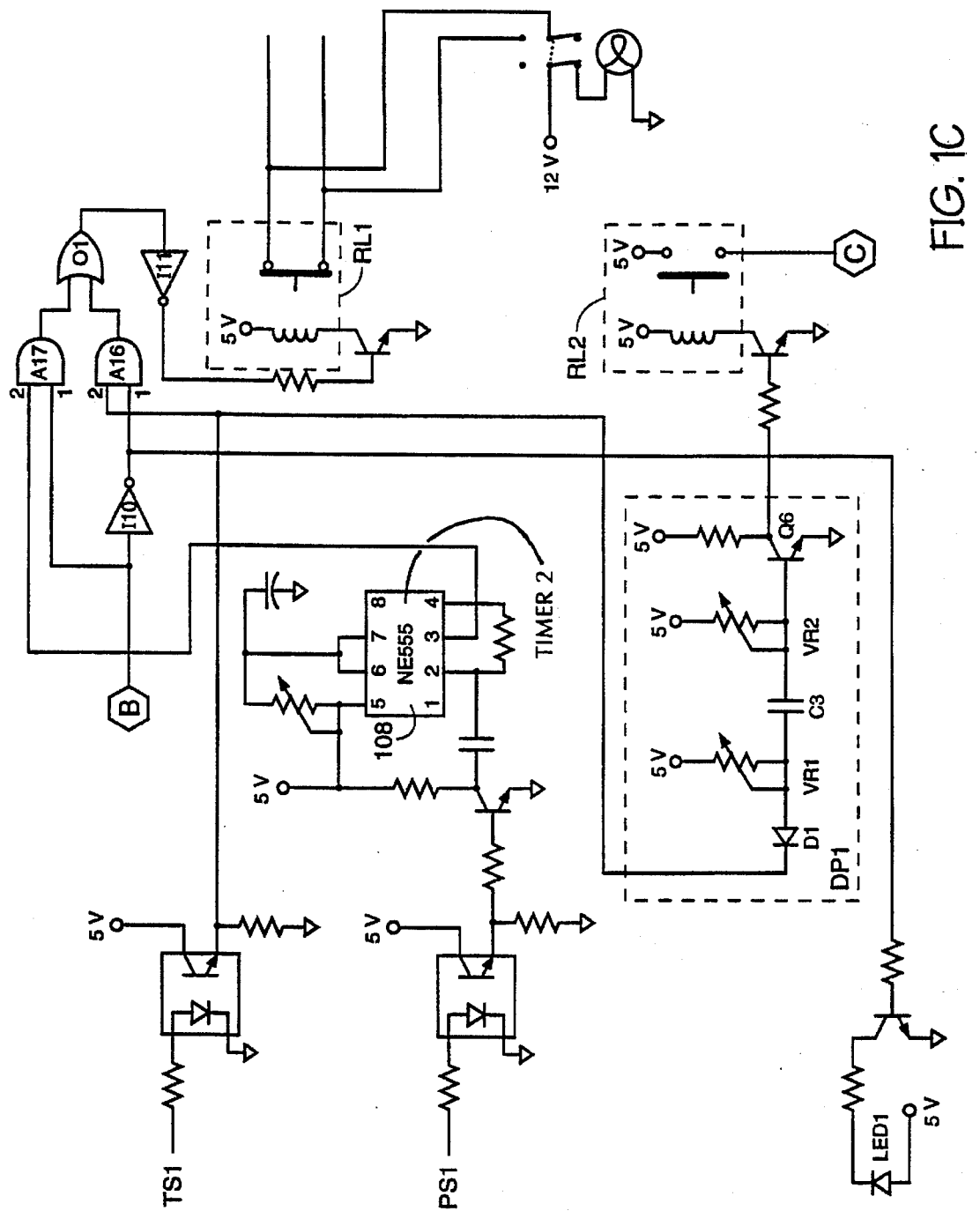

Still referring to FIG. 1C, a delay path DP1 delays the arrival of the trigger sensor signal TS1 to transistor Q4, which activates normally-open relay RL2 and generates a delayed reset pulse which resets the counter 105 (see FIG. 1B). The delay occurs during the gap between workpieces on the conveyor system, and permits the count comparison at AND gate A16 to be completed prior to the generation of the delayed reset pulse by relay RL2.

Still referring to FIG. 1C, light emitting diode D1, which is coupled to the output of AND gate A15, is "ON" while the count is being tallied (i.e., while the output of A15 is high).

Figure 2:
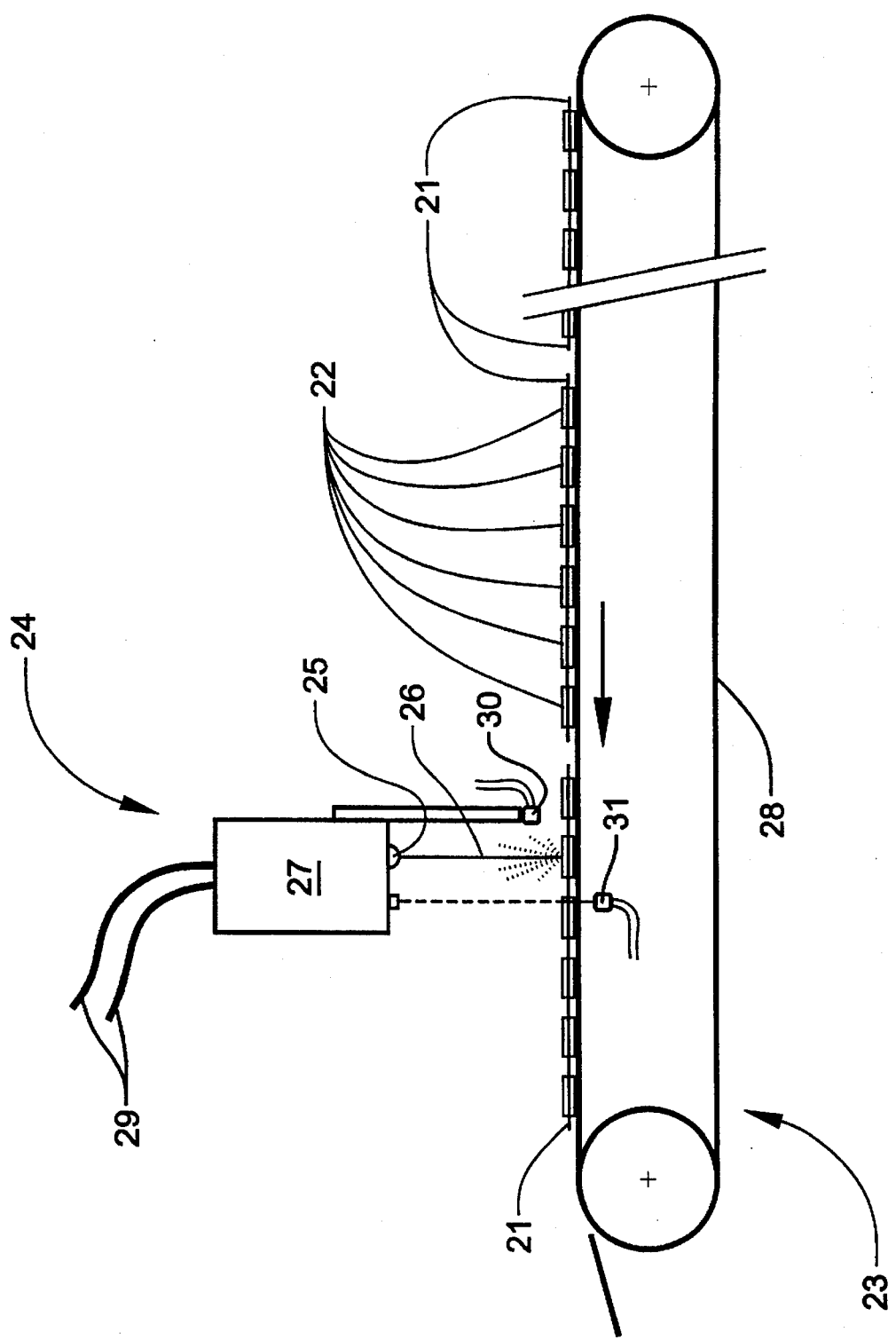
FIG. 2 is a side elevational view of a conveyer system which transports lead frame strips incorporating unsingulated electronic packages to a laser marking station.

Referring now to FIG. 2, a plurality of leadframe strips 21, each of which incorporates six unsingulated electronic packages 22 containing encapsulated semiconductor chips, are being transported by a conveyor system 23 past a laser marking station 24. The laser marking station includes a computer-controlled laser 25 which produces a beam 26 which has sufficient energy to ablate the surface of the packages 22, thereby leaving identifying writing thereon. The laser is mounted within a housing 27 that is stationary with respect to the moving conveyor belt 28. Power and computer interconnect cables 29 couple the laser to a power supply and to a computer (neither of which is shown in this Figure). A microphone 30 is positioned proximate the site where the ablation occurs so that it may pick up the acoustic energy generated by the laser ablation process. A optical proximity sensor 31 senses the arrival of a lead frame strip at the laser marking station.

Although only a single embodiment of the invention is herein disclosed, it is meant to be only illustrative. Thus, it will be apparent to those having ordinary skill in the art of machine control that changes and modifications may be made to the invention without departing from the spirit and scope of the invention as hereinafter claimed.

What is claimed is:

1. A method for monitoring a laser ablation operation involving multiple ablation sites on a workpiece, the operation being performed by a computer-controlled laser beam which generates acoustic energy while ablating each site, said method comprising the steps of:

(a) converting the acoustic energy associated with the ablating of each site to an analog electrical signal;

(b) converting each analog electrical signal to a digital pulse;

(c) counting the digital pulses associated with the operation; and (d) determining whether or not a counted number of digital pulses corresponds to an expected number of digital pulses.

2. The method of claim 1, wherein the acoustic energy is converted to an analog electrical signal by a microphone proximate to the ablation sites, said microphone receiving the acoustic energy and producing an analog electrical output signal in response thereto.

3. The method of claim 1, which further comprises the step of taking remedial action if the counted number of digital pulses does not correspond to the expected number.

4. An apparatus for monitoring a laser ablation operation involving multiple ablation sites on a workpiece, the operation being performed by a computer-controlled laser beam which generates acoustic energy while ablating each site, said apparatus comprising:

(a) a microphone proximate the ablation sites for receiving the acoustic energy associated with the ablating of each site and producing in response thereto an analog electrical signal;

(b) means for converting the analog electrical signal produced at each ablation site to a single digital pulse, one pulse being produced for each ablation site on the workpiece, said means for converting comprising:

(1) an operational amplifier for receiving and amplifying the analog electrical signal from the microphone;

(2) at least one transistor for rectifying the amplified analog electrical signal; and (3) a timer having an input coupled to the operational amplifier output through the transistor, said timer also having an output;

said monitoring apparatus further comprising:

(c) means for counting the digital pulses associated with the operation; and (d) means for determining whether or not a counted number of digital pulses corresponds to an expected number of digital pulses.

5. The apparatus of claim 4, wherein said means for counting comprises a counter having multiple outputs and at least one input coupled to the timer output.

6. The apparatus of claim 5, wherein said means for deciding comprises a first logic gate array having multiple inputs coupled to the counter outputs and a single output which provides a counter reset signal only when the proper number of digital pulses has been counted.

7. An apparatus for monitoring a laser ablation operation involving multiple ablation sites on a workpiece being transported by a conveyor system, the operation being performed by a computer-controlled laser beam which generates acoustic energy while ablating each site, said apparatus comprising:

(a) a microphone proximate the ablation sites for receiving the acoustic energy associated with the ablating of each site and producing in response thereto an analog electrical signal;

(b) means for converting the analog electrical signal produced at each ablation site to a single digital pulse, one pulse being produced for each ablation site on the workpiece, said means for converting comprising:

(1) an operational amplifier for receiving and amplifying the analog electrical signal from the microphone;

(2) at least one transistor for rectifying the amplified analog electrical signal; and (3) a timer having an input coupled to the operational amplifier output through the transistor, said timer also having an output;

said monitoring apparatus further comprising:

(c) means for counting the digital pulses associated with the operation;

(d) means for determining whether or not a counted number of digital pulses corresponds to an expected number of digital pulses; and (e) means for stopping the conveyor system if the expected number of pulses has not been counted.

8. The circuit of claim 7 which further comprises means for stopping the conveyor system if a workpiece is inadvertently loaded upside down on the conveyor system.

9. The circuit of claim 7, wherein said means for counting comprises a counter having multiple outputs, a first input for receiving a reset signal, and a second input coupled to the timer output.

10. The circuit of claim 9, wherein said means for determining comprises a first logic gate array having multiple inputs coupled to the counter outputs and a single output coupled to the counter reset input, said single output providing a reset signal only when the proper number of digital pulses has been counted.

11. The circuit of claim 10, wherein said means for stopping comprises:

(a) a second logic gate array having an output and a plurality of inputs coupled to the counter outputs, the output of the second gate array providing a first digital signal when the counter registers a zero count and a second digital signal when the counter registers other than a zero count;

(b) a trigger sensor which generates a trigger signal when all locations on the workpiece have been presented to the laser beam, after the output of the first gate array which is representative of the count of locations marked on the workpiece has arrived at the counter's first input, but before the laser beam has begun to mark an additional workpiece;

(c) means for sampling the output of the second gate array in response to receipt of the trigger signal; and (d) means for cutting power to the conveyor system if the output of the second gate array is not zero when sampled in response to receipt of the trigger signal.

12. The circuit of claim 11, wherein the means for stopping further comprises:

(a) a delay path, through which the trigger signal is also coupled to the counter's first input so as to reset the counter after the output of the second gate array has been sampled in response to the receipt of the trigger signal if the counter was not reset by the output of the first gate array because the count was incorrect;

(b) a proximity sensor which generates a proximity signal once the workpiece has moved to a position on the conveyor system where the laser beam should be marking the workpiece;

(c) means for sampling the output of the second gate array in response to receipt of the proximity signal; and (d) means for cutting power to the conveyor system if the output of the second gate array is zero when sampled in response to receipt of the proximity signal.

* * * * *